United States Patent [19]
Ng et al.

[11] Patent Number: 6,039,460
[45] Date of Patent: Mar. 21, 2000

[54] TUBULAR LAMP WITH TRANSPARENT PROTECTIVE OUTER SLEEVE HAVING ONE OPEN END FOR RECEIVING TUBULAR GLASS LAMP BODY WITH TERMINAL PIN ELECTRICAL CONNECTOR

[75] Inventors: Tony Ng, Chino Hills; Mike Murphy, Canyon Country, both of Calif.

[73] Assignee: Aquafine Corporation, Valencia, Calif.

[21] Appl. No.: 09/058,257

[22] Filed: Apr. 10, 1998

Related U.S. Application Data

[60] Provisional application No. 60/043,654, Apr. 11, 1997.

[51] Int. Cl.$^7$ ........................................ F21V 29/00
[52] U.S. Cl. .................... 362/267; 362/101; 362/226; 362/225; 362/223; 362/376; 362/377; 362/378; 362/400
[58] Field of Search ..................... 362/101, 226, 362/225, 223, 376, 377, 378, 400

[56] References Cited

U.S. PATENT DOCUMENTS 1,843,512  2/1932  Hutchison ............................ 362/101
5,144,545  9/1992  Klitzing ............................... 362/101

*Primary Examiner*—Sandra O'Shea
*Assistant Examiner*—Ronald E. Delgizzi
*Attorney, Agent, or Firm*—Kelly Bauersfeld Lowry & Kelley, LLP

[57] ABSTRACT

An improved mounting arrangement is provided for supporting a tubular lamp, particularly such as a lamp used in fluid treatment processes, within a protective jacket such as a transparent sleeve of quartz glass or the like. The protective jacket is mounted by a compression nut to a threaded socket adapted for slide-fit reception of the lamp through the socket and into the protective jacket. The lamp comprises an elongated tubular glass lamp body having distal and proximal ends thereof supported by distal and proximal end caps each including spacers for centering the lamp body in spaced relation to the protective jacket. The proximal end cap comprises a lamp base with conductive terminal pins for connection to an electrical power source, and further includes outwardly projecting lock tabs for engagement, preferably with a quarter-turn rotation, with the compression nut to releasibly lock the lamp in position. A terminal connector is provided for coupling the terminal pins to a power source, and is removably retained in place by a retainer cap mounted onto the compression nut.

26 Claims, 6 Drawing Sheets

TUBULAR LAMP WITH TRANSPARENT PROTECTIVE OUTER SLEEVE HAVING ONE OPEN END FOR RECEIVING TUBULAR GLASS LAMP BODY WITH TERMINAL PIN ELECTRICAL CONNECTOR

CROSS-REFERENCES TO RELATED APPLICATIONS

This application derives from provisional application No. 06/043,654, filed Apr. 11, 1997.

BACKGROUND OF THE INVENTION

This invention relates generally to improvements in tubular lamps, particularly of the type used in fluid treatment processes such as purifying water by means of irradiation. More specifically, this invention relates to an improved mounting arrangement for quickly and easily positioning and supporting a tubular lamp within a protective outer jacket such as a transparent sleeve of quartz glass or the like.

Tubular lamps of the type used in fluid treatment processes are generally known in the art, wherein the lamp comprises a radiation or light source designed to perform a particular process step such as the purification of water with ultraviolet radiation. Such lamps are typically designed for mounting individually or in a group within an opaque housing or cartridge, with each lamp supported at one end to extend from a support or mounting plate into radiative association with the fluid to be treated. Moreover, each lamp is normally supported and sealed within a protective transparent outer jacket formed typically from quartz glass or the like to protect the fragile lamp body from direct physical contact with the fluid to be treated.

While such lamps for fluid treatment processes have been used in a range of commercial and industrial applications, problems have been encountered with mechanical fixturing and support of the tubular lamp body within the protective outer jacket. More specifically, existing lamp mounting arrangements have not provided consistent positioning and support of the lamp body within the protective outer jacket, resulting in occasional and undesirable direct contact between the glass lamp body and the protective jacket. In the presence of mechanical vibrations and/or temperature differentials, such component contact can fracture or shatter the lamp body. Moreover, current designs for coupling the lamp to a source of electrical power have been susceptible to working loose in the presence of mechanical vibrations and/or thermal gradients, to result in an additional failure mode which can pose a fire hazard.

There exists, therefore, a need for further improvements in and to arrangements for supporting and mounting a tubular lamp within a protective outer jacket, particularly with respect to supporting the tubular lamp in a secure and stable manner centered within but spaced from contact with the protective jacket, and wherein the lamp is coupled to an electrical power source in a manner resistant to inadvertent disconnection or loosening of the coupling components. The present invention fulfills these needs and provides further related advantages.

SUMMARY OF THE INVENTION

In accordance with the invention, an improved mounting arrangement is provided for fixturing and supporting a tubular lamp within a protective outer jacket, such as a lamp of the type used in fluid treatment processes and supported within a transparent sleeve of quartz glass or the like. The mounting arrangement comprises spacer means for supporting an elongated lamp body of glass or the like in predetermined spaced relation within the protective jacket, and terminal means for securely coupling the lamp to a suitable electrical power source.

The protective outer jacket, in the preferred form, comprises an elongated transparent sleeve of quartz glass or the like, having one closed end and an opposite open end. A compression nut is carried on the jacket sleeve at the open end thereof and is adapted for mounting onto a threaded socket formed on a mounting plate at one side of a chamber or channel formed in a process fluid cartridge or housing. The compression nut supports the protective sleeve from the socket in a position protruding into the process fluid chamber or channel, with the open end of the sleeve exposed through the socket to the exterior of the fluid chamber or channel.

The elongated lamp body has distal and proximal ends carried by a pair of distal and proximal end caps for slide-fit reception into the protective jacket sleeve, with each end cap including at least one spacer for supporting the lamp body in substantially centered and spaced relation to the protective sleeve upon slide-fit insertion of the lamp through the open socket. In addition, the proximal end cap comprises a lamp base positioned generally within the socket and supporting conductive terminal pins to protrude outwardly therefrom. This lamp base includes a plurality of radially outwardly projecting lock tabs for engaging a lock track formed on the compression nut, preferably with a quarter-turn rotation, for quick and easy securement of the lamp to the compression nut. A terminal connector is coupled in turn with the terminal pins, for coupling the lamp to an electrical power source, with a retainer cap threadably secured to the compression nut for removably retaining the terminal connector in coupled relation with the lamp.

Other features and advantages of the present invention will become more apparent from the following detailed description taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
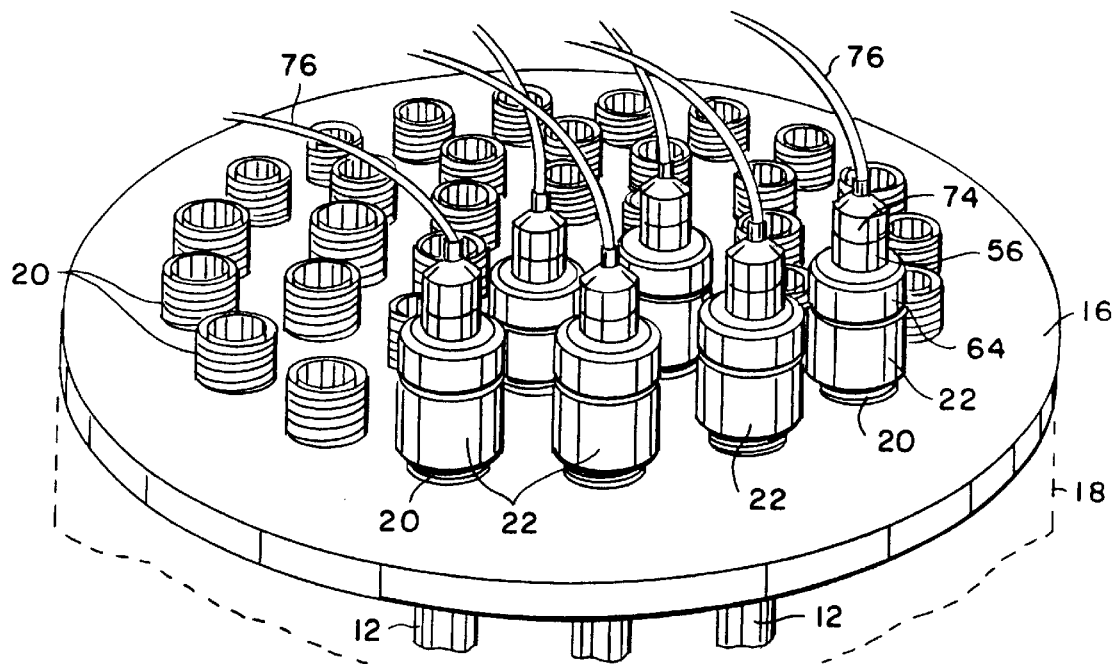
FIG. 1 is a fragmented perspective view showing a plurality of tubular lamps in a fluid treatment application, supported in accordance with the improved mounting arrangement of the invention.

As shown in the exemplary drawings, an improved mounting arrangement is provided for supporting a tubular lamp referred to generally by the reference numeral 10 within a protective outer jacket such as a transparent sleeve 12 of quartz glass or the like. The tubular lamp 10 is supported within the protective jacket sleeve 12 in a secure and stable manner, with spacer means preventing direct physical contact between a glass lamp body 14 and the protective sleeve 12. In addition, the mounting arrangement provides terminal means for removably yet securely coupling the lamp 10 to an electrical power supply.

Figure 2:
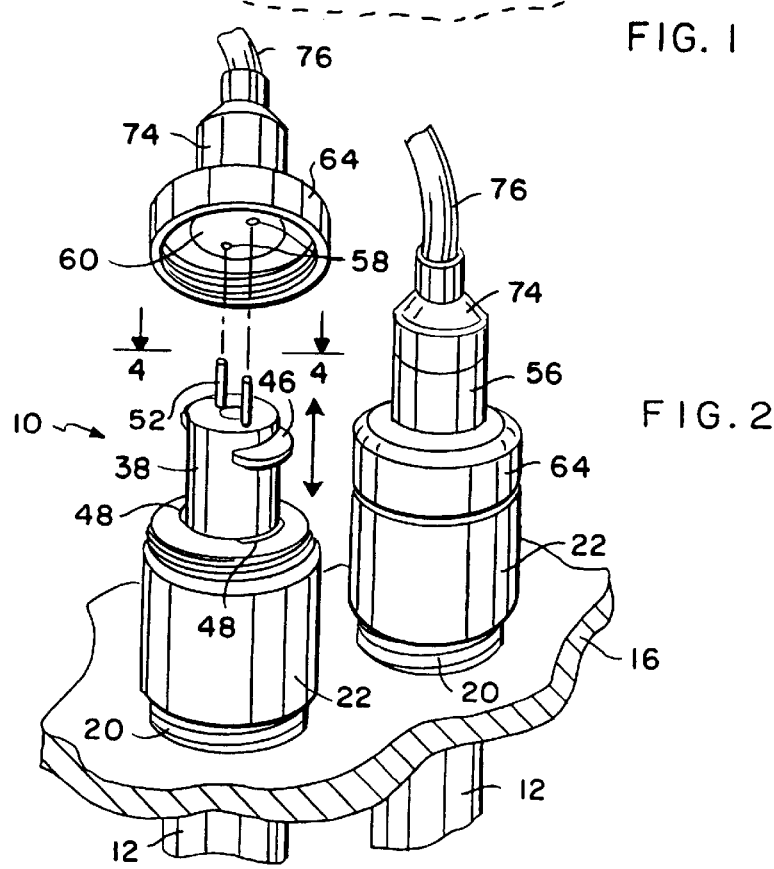
FIG. 2 is an enlarged and fragmented exploded perspective view similar to a portion of FIG. 1, and showing further details of the lamp mounting arrangement.

The tubular lamp 10 comprises a source of radiation or light energy useful in the treatment of a fluid, such as an ultraviolet lamp of the type used to purify water. In this regard, FIGS. 1 and 2 show a plurality of the tubular lamps 10 mounted on a substrate or mounting plate 16 in accordance with the improved mounting arrangement of the present invention, wherein the mounting plate 16 normally comprises one side wall of a treatment housing or cartridge 18 defining a chamber or flow channel for the fluid to be treated. FIGS. 1 and 2 show the lamps 10 installed within individual protective transparent sleeves 12 suspended from the mounting plate 16 to extend into the interior of the treatment chamber or channel, although persons skilled in the art will recognize that the lamps 10 within the associated protective sleeves 12 may be provided in any vertical or horizontal orientation. Moreover, it will be understood that the mounting arrangement of the present invention may be employed in a treatment system having a single lamp 10 positioned within a protective sleeve 12 for irradiating a fluid to be treated.

Figure 3:
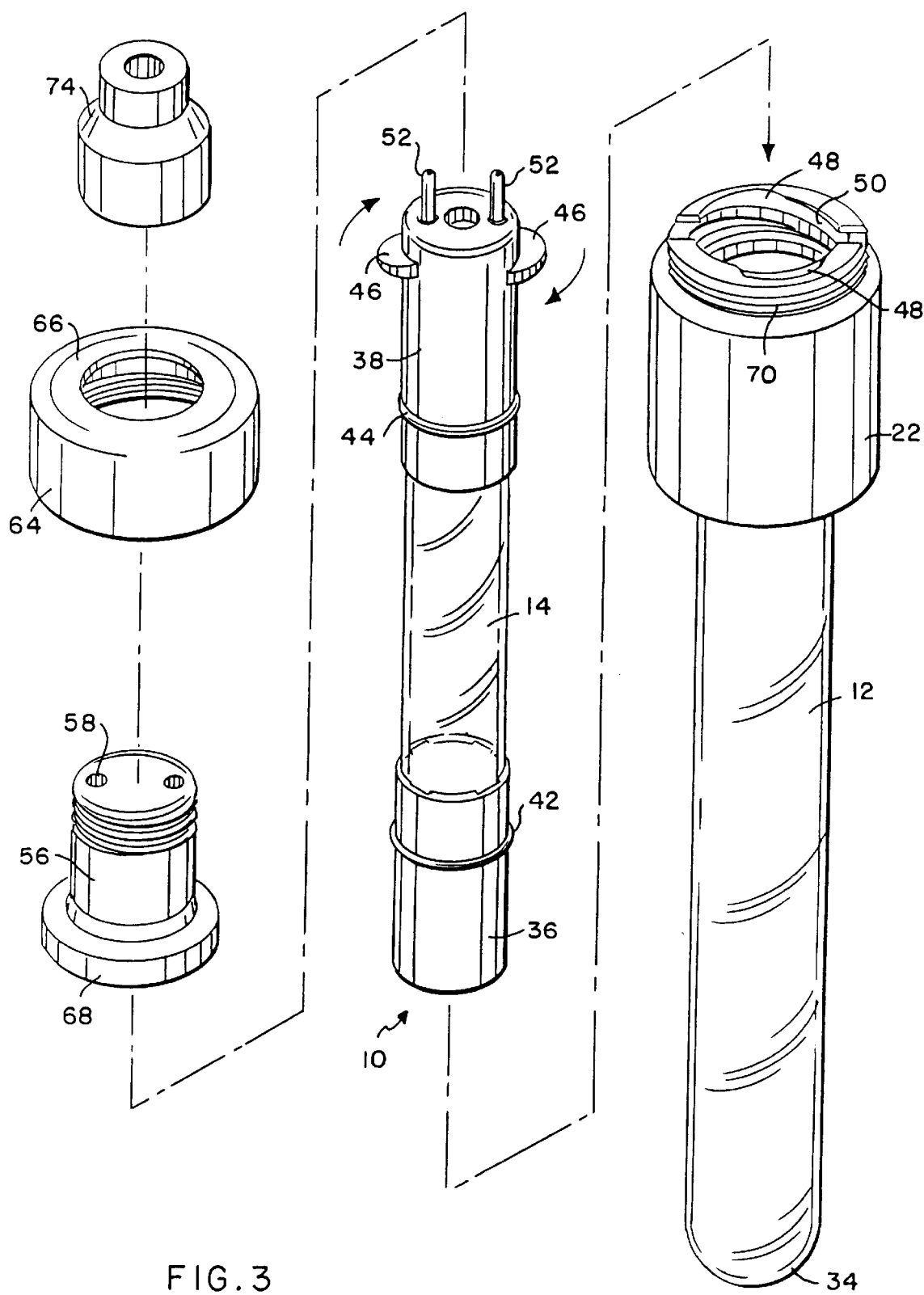
FIG. 3 is an exploded perspective view depicting a tubular lamp and related mounting components.
Figure 4:
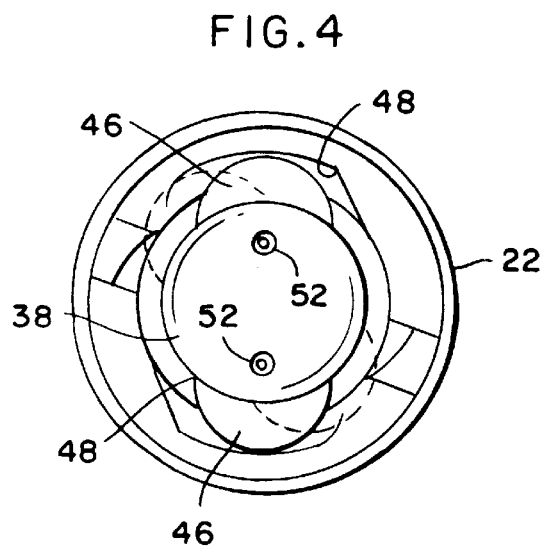
FIG. 4 is a top plan view showing installation of a lamp into a compression nut, taken generally on the line 4—4 of FIG. 2.
Figure 5:
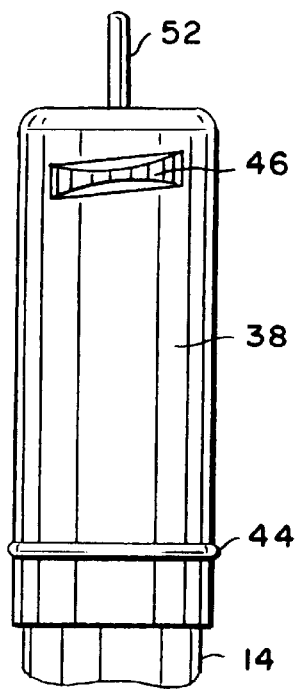
FIG. 5 is a fragmented side elevation view of a proximal end of the lamp.

As shown in more detail in FIGS. 2 and 3, each lamp 10 is adapted for slide-fit reception through and removable support within an associated threaded socket 20 formed on the mounting plate 16, preferably to extend on the mounting plate in a direction away from the associated fluid treatment chamber or channel. Each socket 20 is generally cylindrical in shape to define an open bore therethrough, and is externally threaded for relatively simple thread-on mounting of a compression nut 22. In addition to providing a convenient fixturing and support structure for removable mounting of the lamp 10, as will be described in more detail, the compression nut 22 supports the protective sleeve 12 relative to the socket 20 and in a position protruding through the mounting plate 16 into the interior of the fluid treatment housing. The compression nuts 22 may be conveniently formed with a smooth cylindrical outer shape for hand-tightened mounting onto the sockets 20, wherein this geometry accommodates a maximum number of lamp mounting sites in a minimum space.

Figure 6:
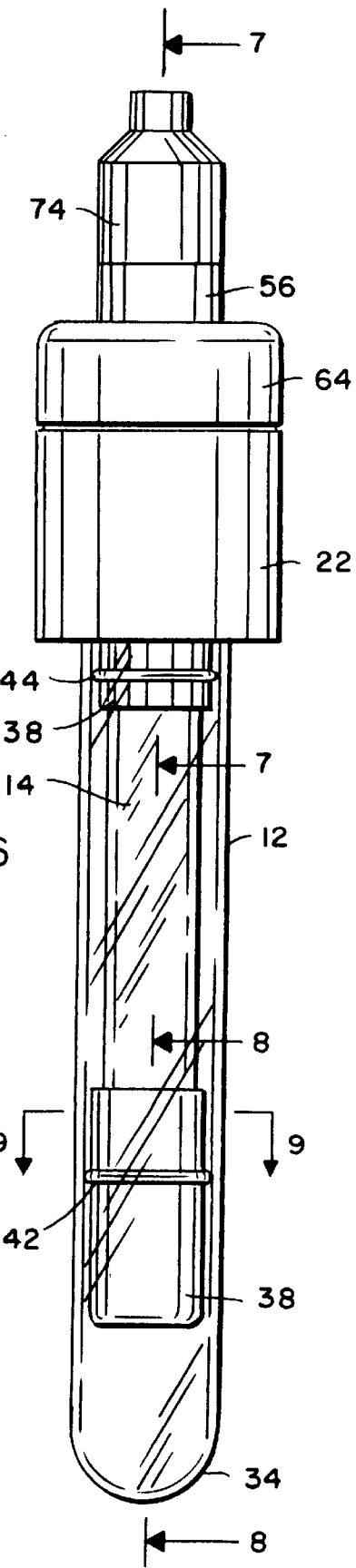
FIG. 6 is a side elevation view illustrating the lamp and related mounting components of FIG. 3 in assembled relation.
Figure 7:
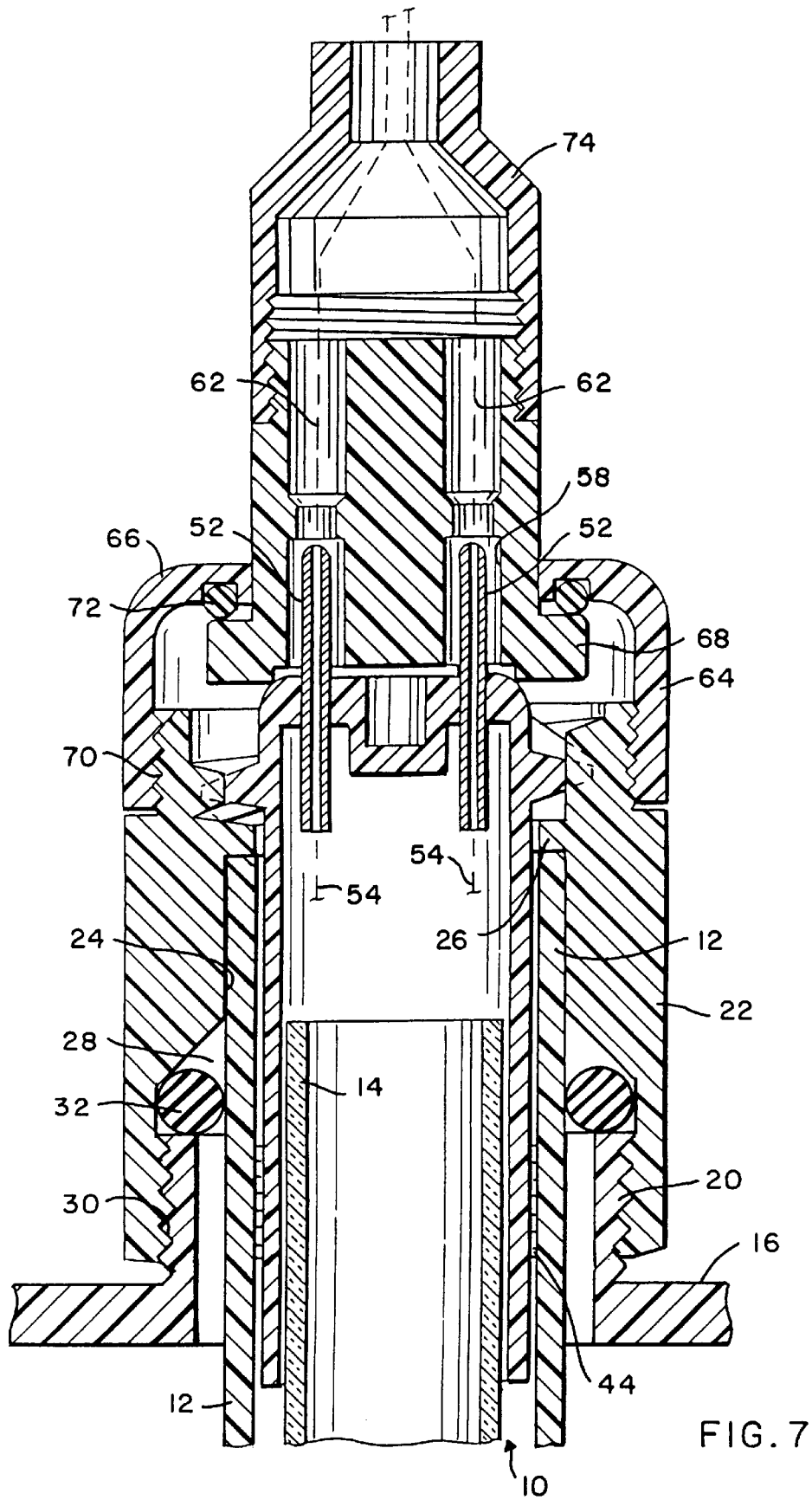
FIG. 7 is an enlarged and fragmented vertical sectional view taken generally on the line 7—7 of FIG. 6.
Figure 8:
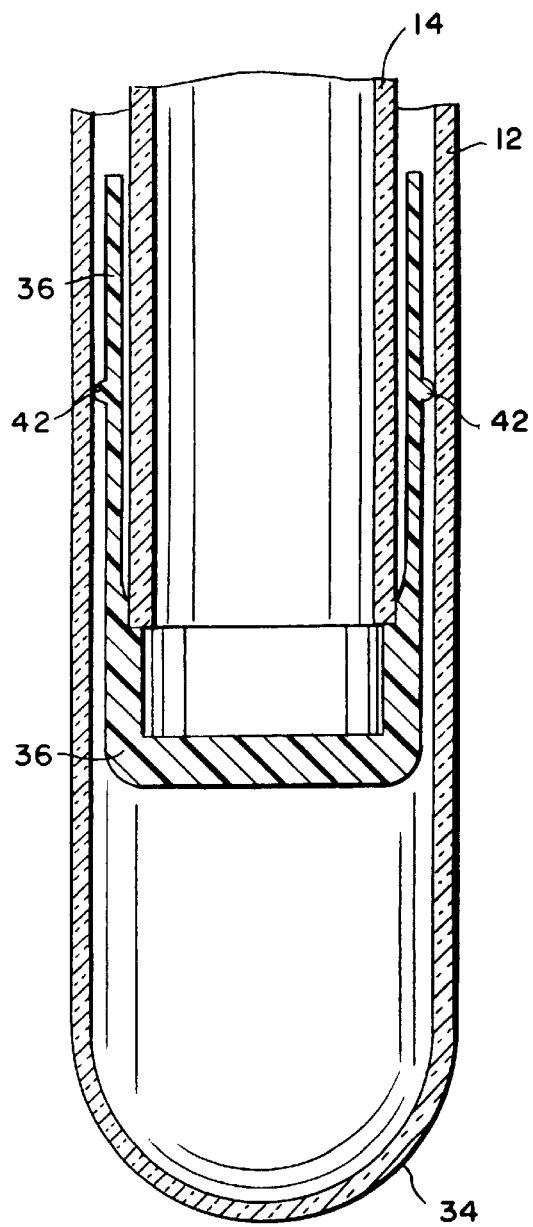
FIG. 8 is an enlarged and fragmented vertical sectional view taken generally on the line 8—8 of FIG. 6.

More particularly, as shown best in FIG. 7, the compression nut 22 defines a relatively smooth-walled central bore segment 24 bounded at an upper end by a radially inwardly projecting stop rim 26. A lower end of this central bore segment 24 transitions through a downwardly and radially outwardly expanding shoulder 28 to merge with a lower, internally threaded bore segment 30 for thread-on engagement with the threaded socket 20. An open upper end of the protective sleeve 12, which is typically formed from quartz glass, is slidably fitted into the central bore segment 24, followed by thread-on mounting of the compression nut 22 onto the associated socket 20. A seal ring 32 disposed at the expanding shoulder 28 is thereby compressed at the upper end of the socket 20, and between the compression nut 22 and the upper end of the sleeve 12, to provide a secure and fluid-tight connection of the sleeve 12 relative to the socket 20. From the socket 20, the protective sleeve 12 extends into the treatment chamber or channel, terminating as shown in an opposite or lower closed end 34 (FIGS. 3 and 6).

Figure 9:
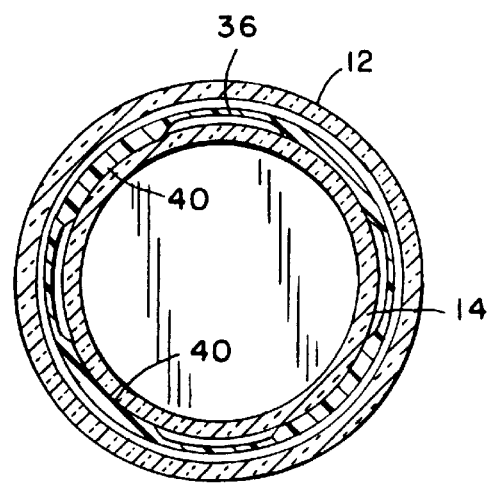
FIG. 9 is an enlarged and fragmented horizontal sectional view taken generally on the line 9—9 of FIG. 6.

The tubular lamp 10 is adapted for quick and easy removable mounting to the compression nut 22, to extend from the compression nut within the protective sleeve 12. FIGS. 3–9 show the lamp 10 to include the relatively fragile glass lamp body 14 extending between a pair of distal and proximal end caps 36 and 38, wherein these end caps may be formed from a suitable metal or plastic material. In a preferred form, these ends caps 36 and 38 are formed from molded plastic with internal ribs 40 as shown in FIG. 9 with respect to the distal end cap 36 for supporting the glass lamp body 14 at spaced points about the periphery thereof. Importantly, the distal and proximal end caps 36, 38 additionally include external spacer means shown respectively in the form of externally formed circumferential spacer rings 42 and 44 (FIGS. 3 and 5–8). These spacer rings 42, 44 function upon slide-fit insertion of the lamp 10 through the associated socket 20 for maintaining the fragile lamp body 14 in a substantially centered and concentric but slightly spaced relation with the interior surface of the protective outer sleeve 12.

The proximal end cap 38 additionally functions as a lamp base for physically supporting the lamp 10 relative to the associated socket 20, and also for facilitating electrical connection of the lamp to an appropriate power source. More particularly, as shown in FIGS. 2–5, the proximal end cap 38 additionally includes a pair of lock ears or tabs 46 extending radially outwardly in opposite directions near an upper end thereof. In one preferred form, these lock tabs 46 are angularly set to comprise separate segments of a common single thread turn. These thread tabs 46 are sized to fit through a corresponding pair of upwardly open lobes 48 formed in an upper end of the compression nut 22 to permit engagement of the thread tabs 46 with a matingly formed internal thread segment 50 formed within an upper end of the compression nut at a location above the smooth central bore segment 24. Accordingly, with this construction, the lamp 10 can be slide-fitted through the socket 20, with the distal end cap 36 at a leading end thereof, to place the lamp protectively within the outer sleeve 12. As the proximal end cap 38 slides into the socket, the lock tabs 46 are fitted through the lobes 48 to engage the upper thread 50, at which time a sufficient portion of the proximal end cap 38 remains exposed above the compression nut 22 to permit grasping and rotating of the lamp 10 preferably through a quarter-turn displacement to securely lock the lamp in position.

A pair of terminal pins 52 are also carried by the proximal end cap 38, to protrude upwardly from the lamp 10 at the top of the compression nut 22 when the lamp is installed therein. FIG. 7 shows the terminal pins 52 coupled by conductors 54 to appropriate internal lamp components (not shown) such as one or more filaments, to energize the lamp when the terminal pins 52 are connected to a suitable power source. For this purpose, a terminal connector 56 is provided with a pair of apertures 58 formed in a lower face 60 thereof (FIG. 2) for plug-in reception of the terminal pins 52 on the lamp end cap 38. The terminal connector 56 includes appropriate conductors 62 (FIG. 7) therein for electrical connection with the terminal pins 52.

In accordance with one aspect of the invention, a retainer ring or cap 64 is provided for removably locking the terminal connector 56 in connected relation with the lamp terminal pins 52. This retainer cap 64 is shown in the form of an internally threaded collar having an inwardly radiating shoulder 66 for engaging an outwardly extending flange 68 formed on a lower end of the terminal connector 56. When the terminal connector 56 is coupled to the lamp end cap 38, the retainer cap 64 can be threadably engaged with an external thread segment 70 at the uppermost end of the compression nut 22 to lock the components together. A seal ring 72 may be interposed between the cap shoulder 66 and the connector flange 68 to provide a fluid tight interconnection. A cover cap 74 may also be provided for screw-on attachment the terminal connector 56, wherein the cover cap collects the conductors 56 within an insulated multilead wire 76 (FIGS. 1 and 2) for convenient connection to the electrical power source (not shown).

Figure 10:
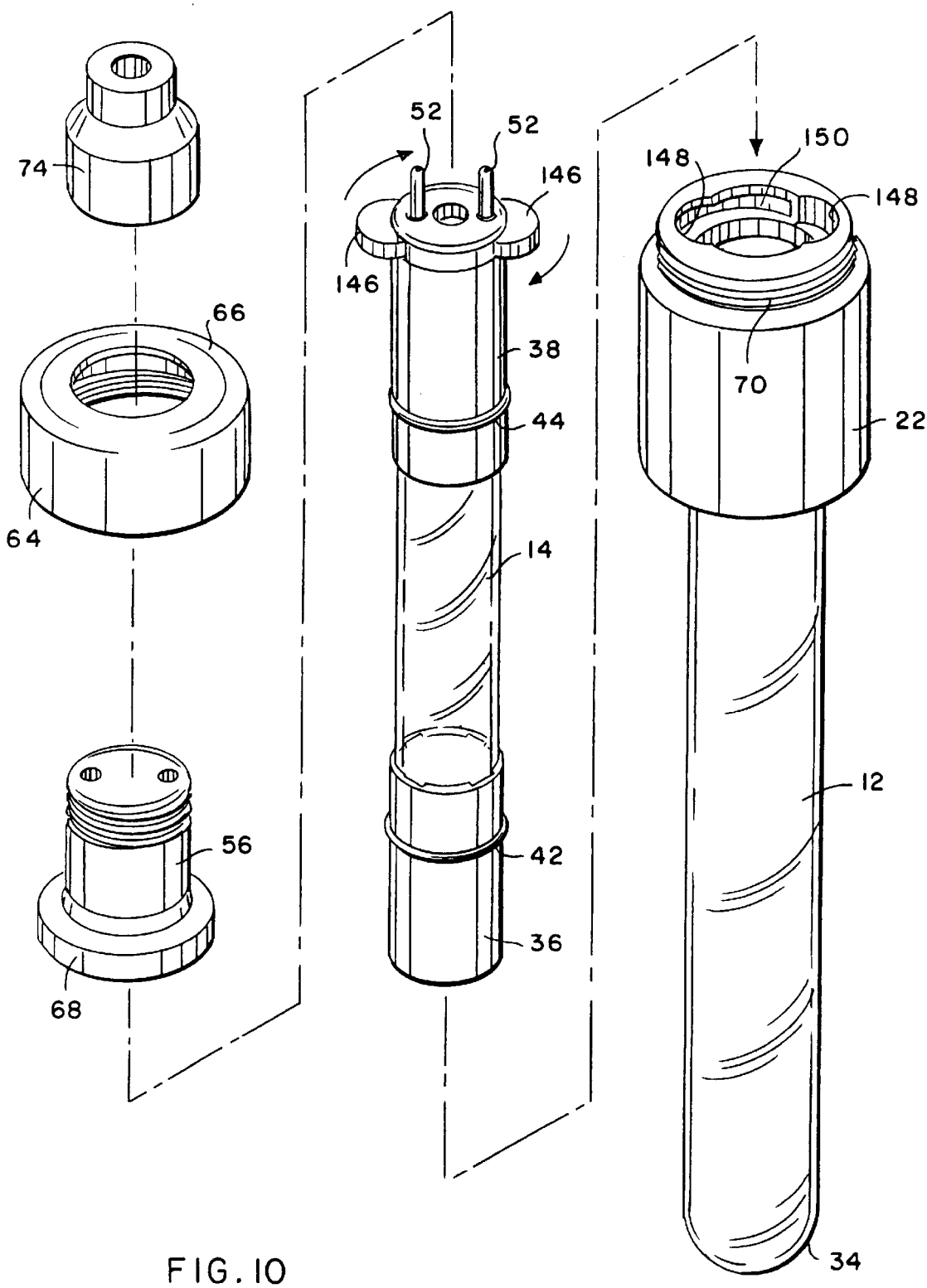
FIG. 10 is an exploded perspective view similar to FIG. 3, and depicting an alternative preferred form of the invention.

FIG. 10 illustrates an alternative preferred form on the invention, wherein components corresponding to those shown and described in FIGS. 1–9 are referred to by the same reference numerals. This embodiment of FIG. 10 is substantially identical to the structure shown and described in FIGS. 1–9 with the exception of the quarter-turn connection between the compression nut 22 and the proximal end cap 38 on the tubular lamp 10. More specifically, in this embodiment, modified lock tabs 146 are formed on the proximal end cap 38 to project radially outwardly therefrom, wherein these lock tabs 146 are sized to fit through arcuate lobes 148 in the upper face of the compression nut 22 for seated reception into a corresponding pair of undercut arcuate slots 150. Within these slots 150, the lamp 10 can be rotated through an approximate quarter turn for securely mounting the lamp 10 from the compression nut 22 and relative to the associated socket 20.

The improved mounting arrangement of the present invention thus provides means for secure and stable support of the tubular lamp 10 at one end thereof, relative to a socket 20 from which the lamp may extend into operative relation with a fluid to be treated. In this mounted position, the lamp 10 is retained within a protective outer jacket or sleeve 12 in a manner preventing direct physical contact between the sleeve and lamp, and thereby protecting the lamp from breakage which could otherwise undesirably occur incident to such contact. In addition to supporting the lamp relative to the compression nut and socket, the proximal end cap 38 provides a convenient site for coupling the lamp to a power source, by means of the terminal connector 56 which is locked thereto to reduce likelihood of inadvertent component separation. However, when and if removal and replacement of a lamp is desired, the components are quickly and easily disassembled to expose the upper end of the proximal end cap 38 for easy lift-out lamp removal and slide-fit installation of a replacement lamp.

A variety of further modifications and improvements in and to the lamp mounting arrangement of the present invention will be apparent to those persons skilled in the art. Accordingly, no limitation on the invention is intended by way of the foregoing description and accompanying drawings, except as set forth in the appended claims.

What is claimed is:

1. A tubular lamp mounting arrangement, comprising:
 a tubular lamp including an elongated lamp body, and a pair of distal and proximal end caps mounted on said lamp body generally at opposite ends thereof;
 a protective sleeve having an open end, said tubular lamp having a size and shape for slide-fit reception into said sleeve, said distal and proximal end caps each including spacer means for positioning said tubular lamp within said sleeve with said lamp body in spaced relation to said sleeve; and
 mounting means for mounting said protective sleeve on a substrate with said open end disposed for slide-fit reception of said tubular lamp.

2. The tubular lamp mounting arrangement of claim 1 wherein said protective sleeve comprises a transparent sleeve.

3. The tubular lamp mounting arrangement of claim 2 wherein said protective sleeve is formed from quartz glass.

4. The tubular lamp mounting arrangement of claim 1 wherein said lamp body is formed from glass.

5. The tubular lamp mounting arrangement of claim 1 wherein said distal and proximal end caps are formed from plastic.

6. The tubular lamp mounting arrangement of claim 1 further including means for removably locking said tubular lamp in position within said protective sleeve.

7. The tubular lamp mounting arrangement of claim 6 wherein said locking means comprises a pair of outwardly projecting tabs formed on said proximal end cap for part-turn engagement with a lock track formed on said mounting means.

8. The tubular lamp mounting arrangement of claim 7 wherein said lock track comprises a thread.

9. The tubular lamp mounting arrangement of claim 7 wherein said lock track comprises an undercut slot.

10. The tubular lamp mounting arrangement of claim 1 further including terminal pin means carried by said proximal end cap for connecting said tubular lamp to an electrical power source, and further comprising a terminal connector for removable coupling with said terminal pin means, and a retainer cap for removably locking said terminal connector in coupled relation with said terminal pin means.

11. The tubular lamp mounting arrangement of claim 10 wherein said retainer cap is removably connected to said mounting means and includes a shoulder thereon for engaging said terminal connector to retain said terminal connector in coupled relation with said terminal pin means when said retainer cap is connected to said mounting means.

12. The tubular lamp mounting arrangement of claim 1 wherein said mounting means comprises a threaded socket on the substrate, and a compression nut threaded onto said socket and having said open end of said protective sleeve supported therein.

13. The tubular lamp mounting arrangement of claim 12 wherein said proximal end cap includes locking means for releasibly engaging said compression nut to position said tubular lamp within said protective sleeve.

14. The tubular lamp mounting arrangement of claim 13 wherein said locking means comprises a pair of outwardly projecting tabs formed on said proximal end cap for part-turn engagement with a lock track formed on said compression nut.

15. A tubular lamp mounting arrangement for removably supporting a tubular lamp from a substrate, said mounting arrangement comprising:
 an open and externally threaded socket formed on the substrate;
 a protective sleeve having an open end;
 a compression nut having said open end of said sleeve slidably fitted therein, said compression nut being threadably mounted on said socket to support said sleeve from the substrate; and a tubular lamp including an elongated lamp body, and a pair of distal and proximal end caps mounted on said lamp body generally at opposite ends thereof;

said tubular lamp having a size and shape for slide-fit reception into said sleeve, said distal and proximal end caps each including spacer means for positioning said tubular lamp within said sleeve with said lamp body in spaced relation to said sleeve;

said proximal end cap and said compression nut further including interengageable lock means for releasibly locking said tubular lamp in position within said protective sleeve and relative to said compression nut.

16. The tubular lamp mounting arrangement of claim 15 wherein said protective sleeve comprises a transparent sleeve.

17. The tubular lamp mounting arrangement of claim 16 wherein said protective sleeve is formed from quartz glass.

18. The tubular lamp mounting arrangement of claim 15 wherein said lamp body is formed from glass.

19. The tubular lamp mounting arrangement of claim 15 wherein said distal and proximal end caps are formed from plastic.

20. The tubular lamp mounting arrangement of claim 15 wherein said lock means comprises a pair of outwardly projecting tabs formed on said proximal end cap for part-turn engagement with a lock track formed on said compression nut.

21. The tubular lamp mounting arrangement of claim 20 wherein said lock track comprises a thread.

22. The tubular lamp mounting arrangement of claim 20 wherein said lock track comprises an undercut slot.

23. The tubular lamp mounting arrangement of claim 1 further including terminal pin means carried by said proximal end cap for connecting said tubular lamp to an electrical power source, and further comprising a terminal connector for removable coupling with said terminal pin means, and a retainer cap for removably locking said terminal connector in coupled relation with said terminal pin means.

24. The tubular lamp mounting arrangement of claim 23 wherein said retainer cap is removably connected to said compression nut and includes a shoulder thereon for engaging said terminal connector to retain said terminal connector in coupled relation with said terminal pin means when said retainer cap is connected to said compression nut.

25. A tubular lamp mounting arrangement for removably supporting a tubular lamp from a substrate, said mounting arrangement comprising:

an open and externally threaded socket formed on the substrate;

a protective sleeve having an open end;

a compression nut having said open end of said sleeve slidably fitted therein, said compression nut being threadably mounted on said socket to support said sleeve from the substrate;

a tubular lamp including an elongated lamp body, and a pair of distal and proximal end caps mounted on said lamp body generally at opposite ends thereof;

said tubular lamp having a size and shape for slide-fit reception into said sleeve, said distal and proximal end caps each including spacer means for positioning said tubular lamp within said sleeve with said lamp body in spaced relation to said sleeve;

said proximal end cap and said compression nut further including interengageable lock means for releasibly locking said tubular lamp in position within said protective sleeve and relative to said compression nut;

terminal pin means carried by said proximal end cap for connecting said tubular lamp to an electrical power source;

a terminal connector for removably coupling said terminal pin means to a power source; and retainer means removably mounted on said compression nut for retaining said terminal connector in coupled relation with said terminal pin means.

26. The tubular lamp mounting arrangement of claim 25 wherein said retainer means comprises a retainer cap threadably mounted on said compression nut and including a shoulder for bearing against and retaining said terminal connector in coupled relation with said terminal pin means on said proximal end cap.

* * * * *